Patented June 30, 1936

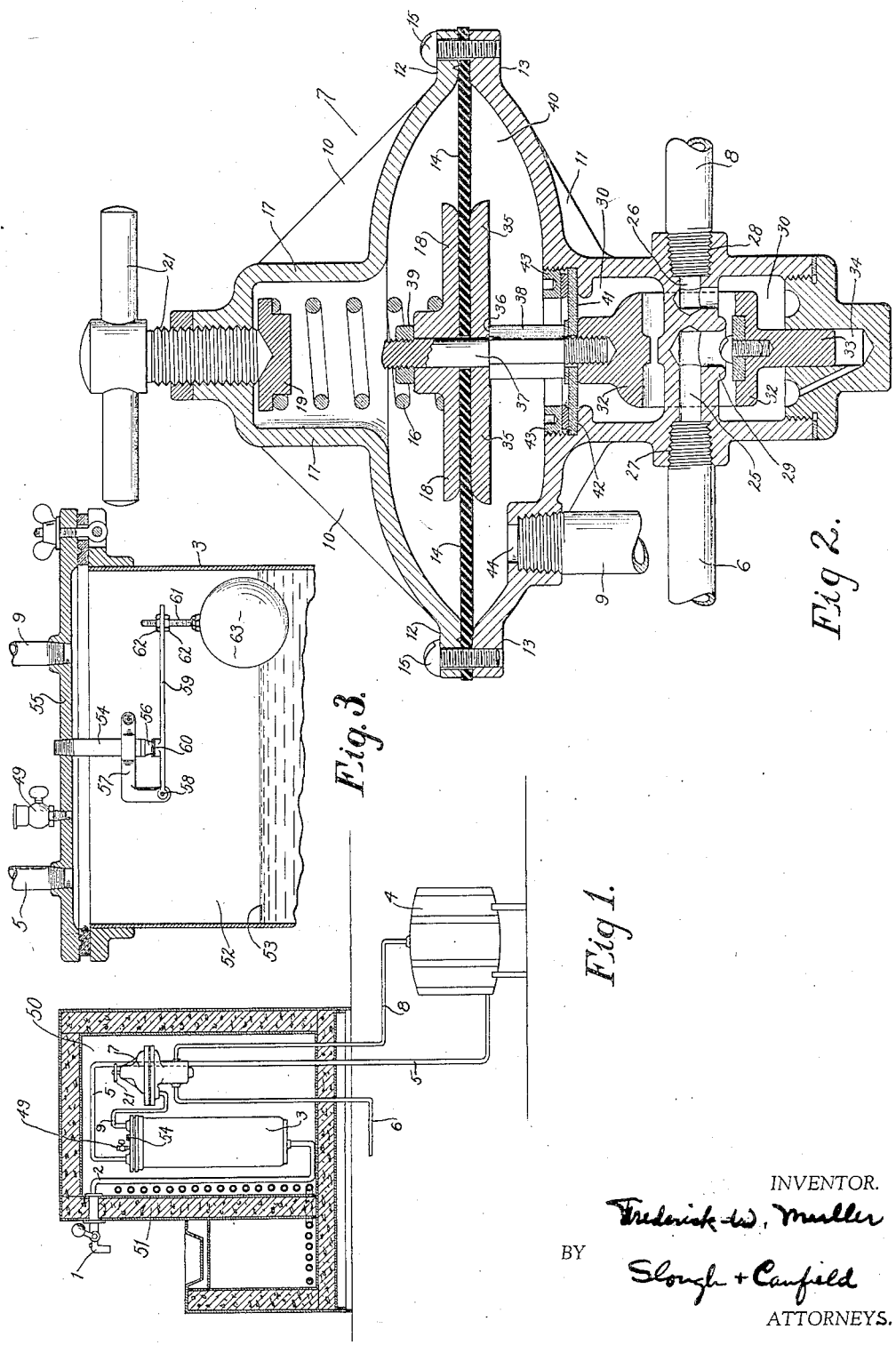

2,046,032

UNITED STATES PATENT OFFICE 2,046,032

APPARATUS FOR DISPENSING BEVERAGES

Frederick W. Müller, Hoboken, N. J., assignor to The Bishop & Babcock Manufacturing Company, Cleveland, Ohio, a corporation of Ohio Application November 2, 1933, Serial No. 696,402

14 Claims. (Cl. 225—9)

This invention relates to apparatus for dispensing beverages and particularly to apparatus designed to dispense beverages such as beer which have gases dissolved therein and which tend to foam or froth when drawn under pressure into an open vessel such as a glass or mug.

Various kinds of apparatus for dispensing beverages are now in use and as usually constructed comprise a tank or reservoir adapted to hold a quantity of beverage under pressure, and a conduit leading from the tank to a faucet or tap through which the beverage is withdrawn.

The conduit usually includes a coil surrounded by a suitable refrigerating medium to cool the beverage as it flows through the coil. In this kind of apparatus the tank or reservoir is supplied with gas under pressure in order to force the beverage from the faucet or tap, the initial pressure in the tank or reservoir being relatively great so that, after a quantity of beverage has been withdrawn, the pressure in the tank or reservoir, although considerably reduced, is still great enough to force the beverage from the faucet or tap. The rate of flow of the beverage out of the faucet is governed by the pressure on the liquid in the tank, and accordingly, the beverage will be discharged much more rapidly when the pressure is high than when the pressure is low; and as the pressure in the tank or reservoir is continuously changing, the rate of flow of beverage from the faucet or tap changes continuously.

It has been found that when beverages such as beer having gas dissolved therein, are discharged under pressure into an open vessel such as a glass or mug, they tend to foam, and that the amount of foam formed varies with the rate of discharge of the beverage, more foam being formed if the liquid is discharged rapidly than if the liquid is discharged slowly. This has caused a great deal of difficulty in dispensing beverages of this kind as it results in glasses of beverage having varying amounts of liquid and foam. Thus when the tank or reservoir is nearly full and the pressure is relatively great and the rate of discharge of the beverage accordingly quite high, a large amount of foam is formed in a glass and the glass is quickly filled, having very little liquid in it however. It is necessary then to allow the foam to settle and to add more beverage to the glass by a second filling in order to have the glass contain the proper amount of liquid.

When the pressure in the tank or reservoir has been lowered as the result of the withdrawal of a quantity of beverage, the rate of flow of beverage from the faucet is decreased and the amount of foam formed is lessened with the result that when a glass is filled with the apparatus in this condition, a different proportion of liquid and foam are found in a glass than when the glass is filled with the tank or reservoir nearly full and under relatively high pressure; and the difference in the relative level of the foam in the glass is known to the trade as different "collar".

The difference in the "collar" on the various glasses of beer or beverage drawn from the dispensing systems now in use has caused a great deal of difficulty as it necessitates returning some of the glasses for a second filling in order to have them contain the proper amount of liquid, beer or beverage and has resulted in some glasses being too full while others are not full enough.

It is an object of this invention to provide an improved beverage dispensing apparatus adapted to be employed to dispense beverages under pressure.

A further object of the invention is to provide an improved beverage dispensing apparatus adapted to be employed to dispense beverages under pressure and to provide a uniform "collar" on a glass of beverage drawn from the system.

Another object of the invention is to provide an improved beverage dispensing apparatus adapted to dispense beverages under pressure and having means to maintain the pressure in the apparatus substantially uniform at all times.

Another object of the invention is to provide an improved beverage dispensing system and apparatus adapted to dispense beverages under pressure and having means to maintain the pressure applied to the beverage substantially at a constant predetermined value, and having means by which the predetermined value may be adjustably varied.

Another object of the invention is to provide an improved beverage dispensing apparatus adapted to be employed to dispense beverages under pressure and having means to maintain the rate of flow of beverage from the apparatus substantially uniform at all times.

Another object of the invention is to provide an improved beverage dispensing system and apparatus adapted to dispense beverages under pressure and having means to maintain the flow of beverage from the apparatus at a substantially uniform predetermined rate, and having means by which the rate of flow may be adjustably varied.

Another object of the present invention is to provide an improved beverage dispensing apparatus adapted to be employed to dispense beverages under pressure and having a cooling tank adapted to hold under pressure a quantity of beverage to be dispensed, a second tank adapted to hold a supply of beverage, and means to force beverage from the second tank to the first tank to maintain the quantity of beverage and the pressure in the first tank substantially at predetermined values.

A further object of the invention is to provide an improved beverage dispensing system and apparatus having a tank adapted to hold a quantity of beverage under pressure, a second tank or reservoir, means to apply pressure to the second tank to force liquid from the second tank to the first tank and in which the pressure in the first tank can be maintained at a predetermined value irrespective of the pressure applied to the second tank.

Another object of my invention is to provide a dispensing system peculiarly adaptable for the dispensing of beer, which being originally placed in storage tanks may be delivered therefrom to dispensing tanks which are positioned adjacent dispensing faucets and generally considerably above the level of the storage tanks, the system being provided with improved means to maintain not only the level of liquid in the dispensing tanks substantially constant but also to maintain the pressure of gas above such level substantially constant whereby the escape of gas from solution in the dispensing tanks may not disable the system but the gas pressure resulting therefrom may be adequately controlled in an improved manner.

Other objects of the invention and features of novelty will be apparent from the following description taken in connection with the accompanying drawing, in which:

Fig. 1 is a view illustrating partly diagrammatically an improved liquid dispensing system embodying my invention;

Fig. 2 is a cross-sectional view of a compensator valve mechanism which I may employ in connection with the apparatus and system shown in Fig. 1 and which is shown therein to a smaller scale; and, Fig. 3 is a sectional view of the upper part of a tank forming a part of Fig. 1 drawn to a larger scale than in Fig. 1.

Referring to the drawing, I have indicated at 1 a faucet or tap which may be of any well known construction and disposed in suitable relation to a bar or fountain 51 and from which tap the beverage is to be dispensed. A conduit 2 connects the faucet 1 with a dispensing tank indicated at 3 and which is adapted to hold a quantity of beverage maintained under pressure by gas confined in the tank above the beverage in the tank. The tank 3 may be of any suitable size and construction but in the preferred form is adapted to hold a substantial quantity of beverage, such as three or four gallons, and is constructed of a suitable noncorrosive material.

The tank 3 may be placed at any desired location but in the preferred arrangement of the apparatus the tank 3 is disposed in an insulated chamber 50 in the counter or fountain 51. Any suitable means for cooling the tank 3 may be provided such as an electric refrigerating coil 64 in the chamber 50 surrounding the tank, or the chamber 50 may be cooled by means of ice. In the preferred form, the conduit 2 is connected to the bottom of the tank 3 so that the cold beer or beverage at the bottom of the tank is withdrawn through the conduit 2 to the faucet 1.

A storage tank, or reservoir, indicated generally at 4, and drawn to reduced scale with respect to the other parts of Fig. 1, is also provided and is connected with the tank 3 by means of a conduit 5 which leads from the bottom of the reservoir 4 to the top of the tank 3. The tank 4 may be of any desired construction and it may be a special tank or reservoir or it may be the barrel or original container in which the beverage is delivered to the consumer. This tank may be variously located but in the preferred arrangement is located in the basement of the building below the floor on which the bar or fountain stands and in which the faucet 1 and the tank 3 are disposed.

It will be seen that the conduit 5 communicates with the tank 3 at or near the top thereof so that the beer or beverage which is introduced into the tank 3 from the reservoir 4 is not mixed with the cold beverage at the bottom of the tank and which is withdrawn through the conduit 2, and so that the beverage must flow the entire length of the tank before being discharged out to the faucet. This insures that the beverage will be properly cooled before being discharged.

The beverage from the reservoir 4 is forced through the conduit 5 to the tank 3 by means of pressure applied to the reservoir 4 from a suitable source of gas pressure (not shown) through the conduits 6 and 8, the amount of gas pressure applied to the reservoir 4 being regulated by means of a regulating valve indicated generally by the reference character 7. The regulating valve 7 is also connected with the upper portion of the tank 3 by means of a conduit 9 so that the regulating valve is responsive to changes in the pressure in the tank 3.

The construction of the regulating valve 7 will be best understood by reference to Fig. 2 of the drawing, and as shown in the drawing the regulating valve comprises an upper housing indicated generally at 10 and a lower housing indicated at 11 and having confronting annular flanges 12 and 13 between which is clamped a circular diaphragm 14 by bolts 15 projected through the flanges and the diaphragm. The diaphragm 14 is normally pressed downwardly by a compression spring 16 in a tubular portion 17 of the housing 10, the lower end of the spring 16 communicating thrust to the diaphragm through a plate 18 on the upper side of the diaphragm. The upper end of the spring 16 abuts upon a head 19 axially adjustably movable in the tubular portion 17 by an adjustment screw 21 threaded in an aperture in the upper end of the tubular portion 17.

The lower housing 11 has ducts 25 and 26 leading thereinto from threaded apertures 27 and 28 in which may be connected the conduits 6 and 8, referred to above. Inwardly the duct 25 communicates with a ported valve seat 29 opening into a chamber 30, and the duct 26 communicates with the chamber 30.

A vertically movable valve element 32 guided on a lower portion thereof by a cylindrical extension 33 movable in a bore 34 of the lower housing engages the valve seat 29 in its upper position to close the duct 25. An upper portion of the valve element 32 is connected with the diaphragm 14 preferably by clamping the plate 18 on the upper side of the diaphragm and a plate 35 on the lower side thereof between a shoulder 36 at a reduced portion 37 of the member 38 which is secured to the valve element 32 and a nut 39 threaded on the reduced portion. The valve element 32 is thus movable with the diaphragm.

A chamber 40 in the lower housing 11 is sealed from the chamber 30 by a diaphragm 41 sealed at its central portion between the valve element 32 and the member 38, and at its periphery sealed upon the housing 11, preferably being clamped between a shoulder 42 provided on the housing 11 and an annular nut 43 threaded into a suitable threaded bore in the housing 11.

The conduit connection 9 provides communication with the chamber 40 through a duct 44 and is connected to the upper portion of the tank 3 as described above.

Pressure on the lower side of the diaphragm 14 applied through the duct 44 from the tank 3 may compress the spring 16 and lift the valve 32 and close the duct 25. A reduction of the pressure in the chamber 40 will permit the spring 16 to move the diaphragm downwardly and open the duct 25 and effect communication of the duct 25 through the ported valve seat 29 into the chamber 30 and thence out through the duct 26; that is, the gas pressure supplied to the conduit 6 will flow through the regulator valve to the conduit 8 and thence to the tank 4.

In operation, the spring 16 is adjusted so that when the pressure in the tank 3 above the liquid in the tank, which pressure is transmitted from the tank to the lower side of the diaphragm by means of the conduit 9, reaches a predetermined value, the diaphragm 14 will be lifted against the tension of the spring 16 and close the communication through the ducts 25 and 26 by closing the ported valve seat 29. This, as will be understood, cuts off the supply of gas pressure from the conduit 6 to the barrel or reservoir 4 and stops further supply of liquid from the reservoir 4 to the tank 3. If the pressure in the tank 3 should fall, as when liquid is withdrawn from the tank 3, the spring 16 will effect opening of the ported valve seat 29 and admit pressure from the pressure supply source to the reservoir 4 through the conduits 6 and 8 and thereby force more liquid to flow from the tank 4 to the tank 3, which in turn tends to compress the gas above the liquid in the tank 3 and raise the pressure thereof to correspondingly prevent the addition of more liquid when the predetermined desired pressure has been reached.

It will be seen that the drawing of liquid from the tank 3 tends to reduce the pressure above the liquid in this tank; and this, by means of the compensator valve described, effects the application of pressure to the barrel or tank 4 to force more liquid into the tank 3 and thereby to restore the pressure therein.

However, when the beverage being dispensed is of the nature of beer having gas in solution, the gas tends to escape from the beer in the tank 3 to occupy the space 52 in the top of the tank, thus creating a gas pressure effective on the surface of the beer and also effective on the lower underside of the diaphragm 14 of the regulating valve 7 and tending to effect closure of the valve opening 29 to prevent additional gas pressure from being transmitted through the conduits 6 and 8 to the space above the level of the liquid in the supply tank 4, and thereby tending to discontinue the flow of additional beer through the conduit 5 to the dispensing tank 3.

In order to prevent such a condition wherein the supply of beer in the tank 3 would not be sufficiently replenished, the additional valve regulating means illustrated in Fig. 3 is provided in the upper portion of the dispensing tank 3 whereby when the upper surface of the liquid in the dispensing tank falls below a predetermined level indicated at 53, by reason of beer being drawn as from the dispensing tank by operation of the beer faucet 1, then a float 63 in the dispensing tank 3 will also be lowered to permit the gas under pressure in the space 52 above the liquid to be vented to outside atmosphere. The float actuative vent valve apparatus of Fig. 3 may be constructed as follows:—

A small vent pipe 54 depends from the cover 55 of the tank 3 and has a valve seat 56 on its lower end. A clamp device 57 on the pipe 54 has pivotally connected thereto as at 58, a float ball arm 59 carrying a valve element 60 of suitable valve seat sealing material such as rubber or the like. On the outer end of the float valve arm 59 is a stud 61 projected through a suitable perforation in the end of the arm 59 and vertically adjustable relative thereto by lock nuts 62—62 on the stud and on opposite sides of the arm 59. On the lower end of the stud a float ball 63 is secured.

By this arrangement, if the liquid level falls below a predetermined level such as that indicated at 53, the float ball 63 will fall by gravity and open the valve 56—60, allowing some of the gas above the liquid to escape to the atmosphere through the pipe 54. This reduces the pressure in the tank 3, and consequently the pressure in the chamber 40 below the diaphragm 14 of the regulator of Fig. 2. This reduction in pressure comes not by reduction of the quantity of liquid in the tank 3, but by a reduction of pressure directly without changing the liquid level. Thereupon the valve device of Fig. 2 operates as above described to admit an additional supply of gas under pressure through the conduits 6 and 8 above the level of the beer in the tank 4, thereby forcing more liquid into the dispensing tank 3 raising the level 53 and operating the float ball 63 to close the valve 56—60.

It will be seen, therefore, that with the system and apparatus provided by my invention, the dispensing tank 3 is kept filled to a predetermined level and that the pressure in the tank above the liquid is maintained at substantially a predetermined value at all times. As the pressure in the tank 3 is maintained substantially constant, the rate of flow of liquid from the faucet 1 is substantially the same at all times with the result that the amount of foam formed on a glass of beer or other beverage will be substantially the same at all times, and each glass of beverage dispensed from the system will contain substantially the same amount of liquid and it will be unnecessary to return glasses for a second filling as has been heretofore required.

It will also be seen that the regulator valve may be adjusted in order that the pressure in the tank 3 above the liquid will be varied as desired, and by varying the pressure in the tank 3, the rate of flow of liquid from the faucet 1 can be varied so that the amount of foam and therefore the amount of collar on a glass of beverage can be regulated very accurately.

The tank 3 may be provided with petcock or valve 49 communicating with the interior of the tank and which may be opened to permit the escape of air in the tank at the initial filling of the tank.

It will be noted also that the tank 3 is kept filled to a predetermined level with liquid and that this liquid is introduced at the top of the tank while the cooled liquid is withdrawn from the bottom. This insures that there will always be an adequate supply of cooled beverage as the tank 3 can be made sufficiently large to permit the beverage to remain in the tank long enough to be properly cooled even though beverage is constantly withdrawn from the faucet 1.

Under the system and with the apparatus provided by this invention, the pressure in the tank 3 which is employed to force the liquid from the faucet 1, is entirely independent of the pressure employed to force the liquid from the reservoir 4 to the tank 3. This is important as a different amount of pressure may be required to force liquid from the reservoir 4 to the tank 3 than would be desired to give the proper rate of flow from the faucet 1.

While one embodiment of the liquid dispensing system provided by my invention together with one form of regulating valve adapted to be employed in this embodiment of the system have been illustrated and described in detail, it should be understood that the invention is not limited to these details of construction and that many changes and modifications may be made without departing from the spirit of the invention and the scope of the appended claims.

I claim:

1. In a liquid dispensing system adapted to be employed to dispense beverages, a dispensing tank adapted to hold a quantity of liquid maintained under pressure, valve controlled conduit means for discharging liquid from said tank, a storage tank adapted to hold a quantity of liquid under pressure, a conduit connection between said storage tank and the dispensing tank, a source of gas pressure, conduit means connecting said gas pressure source with said storage tank, said gas pressure being operative to force liquid from said storage tank to said dispensing tank, means including a valve to control the gas pressure applied to said storage tank, said valve being responsive to changes in pressure in the dispensing tank occasioned by the withdrawal of liquid therefrom and being operative to open the valve and increase the pressure applied to said storage tank on reduction of the pressure in the dispensing tank and being operative to close said valve on rise of the pressure in the dispensing tank to a predetermined value.

2. In a liquid dispensing system adapted to be employed to dispense beverages, a dispensing tank adapted to be partially filled with liquid maintained under pressure by gas pressure in the tank above the liquid, valve controlled conduit means for discharging liquid from said tank, a storage tank adapted to hold a quantity of liquid under pressure, a conduit connection between said storage tank and the dispensing tank, a source of compressed gas and valve means for admitting gas from said gas pressure source to said storage tank to force liquid from said storage tank to said dispensing tank, said valve means being responsive to changes in the pressure of the dispensing tank and being operable on a decrease in the pressure in the dispensing tank occasioned by the withdrawal of liquid therefrom to open and admit gas to said storage tank thereby forcing liquid to the dispensing tank and increasing the pressure in said tank, and being operable to close when the pressure in the dispensing tank reaches a predetermined value whereby the quantity of liquid and the pressure in the dispensing tank are maintained substantially constant.

3. In a liquid dispensing system adapted to be employed to dispense beverages, a dispensing tank adapted to hold a quantity of liquid maintained under pressure, valve controlled conduit means for discharging liquid from said tank, a storage tank adapted to hold liquid under pressure, a source of gas pressure and conduit means applying said pressure to the storage tank, conduit means connecting said tanks, the pressure in the storage tank being operative to force liquid from said storage tank to said dispensing tank and thereby increase the pressure in said dispensing tank, and means to maintain the pressure in the dispensing tank substantially at a predetermined value irrespective of the source pressure applied to the storage tank.

4. In a liquid dispensing system adapted to be employed to dispense beverages, a dispensing tank adapted to hold a quantity of liquid maintained under pressure, valve controlled conduit means for discharging liquid from said tank, a storage tank adapted to hold liquid under pressure, a source of gas pressure and conduit means applying said pressure to the storage tank, conduit means connecting said tanks, the pressure in the storage tank being operative to force liquid from said storage tank to said dispensing tank and thereby increase the pressure in said dispensing tank, means to maintain the pressure in the dispensing tank substantially at a predetermined value irrespective of the source pressure applied to the storage tank, and means to adjustably vary the predetermined pressure value in said dispensing tank.

5. In a liquid dispensing system adapted to be employed to dispense beverages, a dispensing tank adapted to be partially filled with liquid maintained under pressure by gas pressure in the tank above the liquid, valve controlled conduit means for discharging liquid from said tank, a storage tank adapted to hold liquid under pressure, conduit means connecting the storage tank and the dispensing tank, a source of gas pressure, a conduit connecting the source of gas pressure with said storage tank, valve means including a valve interposed in said conduit to control the application of gas pressure to said storage tank, said valve means being responsive to changes in the pressure in the dispensing tank occasioned by the withdrawal of liquid therefrom and being operative to open said valve and admit gas pressure to said storage tank on a reduction in the pressure in the dispensing tank below a predetermined value, thereby forcing liquid from said storage tank to said dispensing tank and thereby increasing the pressure in the dispensing tank, and being operative to close said valve and cut off the application of gas pressure to said storage tank when the pressure in the dispensing tank rises to a predetermined value whereby the pressure in the dispensing tank is maintained at a substantially constant value irrespective of the source pressure applied to the storage tank.

6. In a liquid dispensing system of the type adapted to be employed to dispense beverages, a dispensing tank adapted to hold a quantity of liquid under pressure, valve controlled conduit means for discharging liquid from said tank, a storage tank adapted to hold a supply of liquid under pressure, a conduit connection between said storage tank and the dispensing tank, means responsive upon the occurrence of pressure changes within the dispensing tank to regulate the pressure in the storage tank to effect forcing of liquid from said storage tank to said dispensing tank, and means to maintain the liquid level in the dispensing tank substantially at a predetermined height, said means comprising a valve controlled vent communicating with the interior of the tank, a float disposed within said tank and operable to open the valve on a lowering of the level of the liquid in the tank, and operable to close the valve on a rise of the level of the liquid in the tank to a predetermined height.

7. In a liquid dispensing system of the type adapted to be employed to dispense beverages, a dispensing tank adapted to hold a quantity of liquid under pressure, valve controlled conduit means for discharging liquid from said tank, a pressure storage tank, a gas pressure source, a conduit connection between said storage tank and the dispensing tank, means responsive upon the occurrence of pressure change within the dispensing tank to apply pressure from the source to the storage tank to effect forcing of liquid from said storage tank to said dispensing tank, and means to maintain the liquid level in the dispensing tank substantially at a predetermined height, said means comprising a valve controlled vent communicating with the interior of the tank, regulating means responsive to the amount of liquid in said dispensing tank to vent gases from the space above the liquid contained therein whenever the liquid in said dispensing tank falls substantially below a predetermined level and operable to open the valve on a lowering of the level of the liquid in the tank, and operable to close the valve on a rise of the level of the liquid in the tank to a predetermined height.

8. In a liquid dispensing system adapted to be employed to dispense beverages, a dispensing tank adapted to hold a quantity of liquid maintained under pressure, valve controlled conduit means for discharging liquid from said tank, a storage tank adapted to hold a quantity of liquid under pressure, a conduit connection between the storage tank and the dispensing tank, a source of gas pressure, conduit means connecting said gas pressure source with said storage tank, said gas pressure being operative to force liquid from said storage tank into said dispensing tank, valve means including a valve to control the gas pressure applied to said storage tank, said valve means being responsive to changes in the pressure in the dispensing tank and being operative to open the valve and increase the pressure applied to said storage tank on reduction of the pressure in the dispensing tank, and being operative to close said valve on rise of the pressure in the dispensing tank to a predetermined value, and means to maintain the liquid level in the dispensing tank substantially at a predetermined height, said means comprising a valve controlled vent communicating with the interior of said dispensing tank, a float disposed within said tank and operable to open the valve on a lowering of the lever of the liquid in the tank, and being operable to close the valve on a rise of the level of the liquid in the tank to a predetermined height.

9. In a liquid dispensing system of the type adapted to be employed to dispense beverages, a sealed liquid tank adapted to be partially filled with liquid maintained under pressure by gas pressure in the tank above the liquid, valve controlled conduit means for discharging liquid from said tank, a second sealed liquid tank, conduit means connecting the second tank and the first tank, and means caused to operate by pressure changes in the first tank to regulate the pressure in said second tank.

10. In a liquid dispensing system of the type adapted to be employed to dispense beverages, a dispensing tank adapted to be partially filled with liquid maintained under pressure by gas pressure in the tank above the liquid, a storage tank adapted to be partially filled with liquid maintained under pressure by gas pressure in the tank above the liquid, a conduit joining the storage tank and the dispensing tank, the gas pressure in the storage tank being operative to force liquid from said storage tank to said dispensing tank, and means caused to operate by pressure changes in the dispensing tank to regulate the pressure in the storage tank.

11. In a liquid dispensing system of the type adapted to be employed to dispense beverages, a dispensing tank adapted to hold a quantity of liquid under pressure, valve controlled conduit means for discharging liquid from said tank, a storage tank, a conduit connection between the storage tank and the dispensing tank, and means caused to operate by pressure changes in the dispensing tank, to force liquid from said storage tank to said dispensing tank.

12. In a liquid dispensing system and apparatus, a tank containing liquid under pressure and having means to dispense it therefrom, a source of supply liquid under pressure connected to the tank to supply liquid thereto, means caused to operate by pressure changes in the tank effected by dispensing of liquid therefrom, to effect forcing of liquid from the supply source into the tank and to maintain the pressure in the tank substantially constant during changes of pressure of the source.

13. In a liquid dispensing system and apparatus, a tank containing liquid under pressure and having means to dispense it therefrom, a source of supply liquid under pressure connected to the tank to supply liquid thereto, means caused to operate by pressure changes in the tank effected by dispensing of liquid therefrom to effect forcing of liquid from the supply source into the tank and to maintain the pressure in the tank substantially constant during changes of pressure of the source, and supplemental means dependent upon changes of liquid level in the tank to maintain liquid in the tank above a predetermined minimum level.

14. In a liquid dispensing system adapted to be employed to dispense beverages, a dispensing tank adapted to hold a quantity of liquid maintained under pressure, valve controlled conduit means for discharging liquid from said tank, a storage tank adapted to hold a quantity of liquid under pressure, a conduit connection between said storage tank and the dispensing tank, a source of gas pressure, conduit means connecting said gas pressure source with said storage tank, said gas pressure being operative to force liquid from said storage tank to said dispensing tank, and means to control application of said source of gas pressure responsive upon the occurrence of pressure variations in the dispensing tank.

FREDERICK W. MÜLLER.